(12) United States Patent
Hu et al.

(10) Patent No.: US 10,815,099 B2
(45) Date of Patent: Oct. 27, 2020

(54) LIFTING CONTAINER POWER GENERATING DEVICE USING FLEXIBLE GUIDANCE SYSTEM

(71) Applicant: JIANGSU NORMAL UNIVERSITY, Jiangsu (CN)

(72) Inventors: Ningning Hu, Jiangsu (CN); Zhixiang Li, Jiangsu (CN); Gongbo Zhou, Jiangsu (CN); Penghui Wang, Jiangsu (CN); Zhenzhi He, Jiangsu (CN)

(73) Assignee: JIANGSU NORMAL UNIVERSITY, Jiangsu (CN)

( * ) Notice: Subject to any disclaimer, the term of this patent is extended or adjusted under 35 U.S.C. 154(b) by 210 days.

(21) Appl. No.: 16/304,165

(22) PCT Filed: Dec. 7, 2016

(86) PCT No.: PCT/CN2016/108782
§ 371 (c)(1),
(2) Date: Nov. 23, 2018

(87) PCT Pub. No.: WO2017/206465
PCT Pub. Date: Dec. 7, 2017

(65) Prior Publication Data
US 2020/0095095 A1    Mar. 26, 2020

(30) Foreign Application Priority Data
May 30, 2016 (CN) .......................... 2016 1 0369862

(51) Int. Cl.
*B66B 15/04* (2006.01)
*B66B 15/08* (2006.01)
(Continued)

(52) U.S. Cl.
CPC .............. *B66B 15/04* (2013.01); *B66B 15/08* (2013.01); *F03G 7/00* (2013.01); *F16H 55/49* (2013.01)

(58) Field of Classification Search
CPC . B66B 15/04; B66B 15/08; F03G 7/00; F16H 55/49
(Continued)

(56) References Cited

U.S. PATENT DOCUMENTS 4,620,615 A * 11/1986 Morris .................... B66B 15/04
                                                                187/264
5,501,295 A *  3/1996 Muller .................... B66B 9/00
                                                                187/406

(Continued)

FOREIGN PATENT DOCUMENTS

| CN | 102001564 | 4/2011 |
| CN | 203474150 | 3/2014 |

(Continued)

OTHER PUBLICATIONS

"International Search Report (Form PCT/ISA/210)", dated Mar. 8, 2017, with English translation thereof, pp. 1-4.

*Primary Examiner* — Jeffrey Donels
(74) *Attorney, Agent, or Firm* — JCIPRNET

(57) ABSTRACT

A lifting container power generating device using a flexible guidance system includes a power source section, a power transmission section and an electrical section. The power source section includes a slide recess base electrically connected to a top portion of a flexible lifting container. A body is connected to the slide recess base through a linear bearing. A fixed roller and a sliding roller on the body are symmetrically disposed at two sides of a guide wire rope. Under the combined action of a preloaded spring and a tension spring, the fixed roller and the sliding roller jointly press tightly against the guide wire rope. The power transmission section
(Continued)

includes an electromagnetic clutch axially connected to the fixed roller, and an electromagnetic clutch pulley connected to a power generator pulley via a V-belt. The power source section includes an electrical cabinet connected to the electromagnetic clutch, a power generator and a battery of the flexible lifting container. The power generating device provides the battery of the lifting container with power during an operation of the flexible lifting container, solving issues of safety risks caused by current periodical replacement and charging of a battery of the flexible lifting container.

6 Claims, 2 Drawing Sheets

(51) Int. Cl.
  *F03G 7/00* (2006.01)
  *F16H 55/49* (2006.01)

(58) Field of Classification Search
  USPC .......................................................... 187/403
  See application file for complete search history.

(56) References Cited

U.S. PATENT DOCUMENTS

| | | | | |
|---|---|---|---|---|
| 2018/0093866 | A1* | 4/2018 | Weibel | ............... B66B 5/14 |
| 2018/0118517 | A1* | 5/2018 | Peng | ................. B66B 11/00 |

FOREIGN PATENT DOCUMENTS

| | | |
|---|---|---|
| CN | 104612921 | 5/2015 |
| CN | 105129583 | 12/2015 |
| CN | 105827002 | 8/2016 |
| JP | H0616364 | 1/1994 |
| JP | 2000318939 | 11/2000 |

* cited by examiner

LIFTING CONTAINER POWER GENERATING DEVICE USING FLEXIBLE GUIDANCE SYSTEM

CROSS-REFERENCE TO RELATED APPLICATION

This application is a 371 of international application of PCT application serial no. PCT/CN2016/108782, filed on Dec. 7, 2016, which claims the priority benefit of China application no. 201610369862.0, filed on May 30, 2016. The entirety of each of the above-mentioned patent applications is hereby incorporated by reference herein and made a part of this specification.

BACKGROUND

Technical Field

The present invention relates to a lifting container power generating device, and in particular, to a lifting container power generating device using a flexible guidance system.

Description of Related Art

As a common transportation tool in industrial production, lifting containers are widely applied in underground coal mines, high-rise buildings, and large-scale equipment allocation and transportation. Because the lifting container is in a moving status during operation, it is difficult to use a wired power supply manner to supply power to an electrical apparatus in the lifting container. At the present stage, a battery is used to supply power, especially for lifting containers used in mines. The use of the battery solves the power supply problem for apparatuses in the lifting container. However, after the battery runs out, it is required to manually remove the exhausted battery and replace it with a fully charged battery, or use a charging system installed on the ground to conduct charging. The entire process not only consumes manpower, but also reduces utilization of the lifting container. For the mines, battery replacing and a charging process both bring about potential safety risks for the coal mines.

SUMMARY

Invention objective: In order to solve the problems caused by the use of a battery for power supply in the conventional flexible lifting container, such as periodical replacement of the battery, utilization reduction of the lifting container, and potential safety risks during charging, the present invention provides the flexible lifting container with a flexible lifting container power generating device that is secure and reliable, and can charge the battery in the lifting container during operation of the lifting container.

To achieve the foregoing objective, the present invention adopts the following technical solutions: A lifting container power generating device using a flexible guidance system, where the power generating device includes a power source section, a power transmission section and an electrical section.

The power source section includes a fixed roller, a preloaded spring, a body, a slide recess base, a sliding roller, a tension spring, and a U-shaped slide block; the slide recess base is connected to a top portion of a flexible lifting container, the body is connected to the slide recess base through a linear bearing, and the body can move in a straight line on the slide recess base; the fixed roller and the sliding roller are symmetrically disposed at two sides of a guide wire rope, and an axle of the fixed roller is mounted on a fixed roller bearing of the body; the preloaded spring is connected to the body at one end, and connected to the slide recess base at the other end; the sliding roller is installed on a sliding roller bearing of the U-shaped slide block, and the U-shaped slide block can move in a straight line in a U-shaped slide groove on the body; the tension spring is connected to the body at one end, and connected to the U-shaped slide block at the other end; under the combined action of the preloaded spring and the tension spring, the fixed roller and the sliding roller jointly press tightly against the guide wire rope.

The power transmission section includes a power generator, an electromagnetic clutch, an electromagnetic clutch pulley, a V-belt, and a power generator pulley; an input shaft of the electromagnetic clutch is connected to the axle of the fixed roller, an output shaft of the electromagnetic clutch is connected to the electromagnetic clutch pulley, the electromagnetic clutch pulley is connected to the power generator pulley via the V-belt, and the power generator pulley is mounted on an input shaft of the power generator.

The power source section includes an electrical cabinet mounted on the top portion of the flexible lifting container, the electrical cabinet being connected to the electromagnetic clutch, the power generator and a battery.

Further, the electrical cabinet includes a circuit conditioning module and an electromagnetic clutch control module.

An input end of the circuit conditioning module is connected to an output end of the power generator via a power generator power line, and an output end of the circuit conditioning module is connected to a charging interface of the battery of the lifting container via a battery connection line.

The electromagnetic clutch control module includes a voltage selector, a voltage comparer, and a relay; a charge cut-off voltage is input through a first input end of the voltage selector, a discharge cut-off voltage is input through a second input end of the voltage selector, an output end of the voltage selector is connected to a first input end of the voltage comparer, and a second input end of the voltage comparer is connected to an output end of the battery of the lifting container via the battery connection line; an output end of the voltage comparer is connected to a third input end of the voltage selector and an input end of the relay, and an output end of the relay is connected to a working circuit of the electromagnetic clutch via an electromagnetic clutch power supply line.

Further, outer rims of the fixed roller and the sliding roller both have internally-curved shapes.

Further, a portion of the fixed roller that contacts the guide wire rope, and a portion of the sliding roller that contacts the guide wire rope are both provided with a rubber layer.

Beneficial effects: The present invention has a simple structure, and is stable and reliable. Only through few modifications to the flexible lifting container, the battery in the lifting container can be powered during operation of the flexible lifting container, solving the problems such as periodical replacement and charging of the battery in the conventional flexible lifting container, and potential safety risks during charging. Thus, the security, reliability, and operation efficiency of the lifting container are improved. It is rather convenient to control power on/off of the power generator by using the electromagnetic clutch. Power input for the power generator is cut off when the battery is fully charged, which can effectively reduce a battery damage caused by overcharge, and also alleviate abrasion between the fixed roller, the sliding roller, and the guide wire rope.

Figure 1:
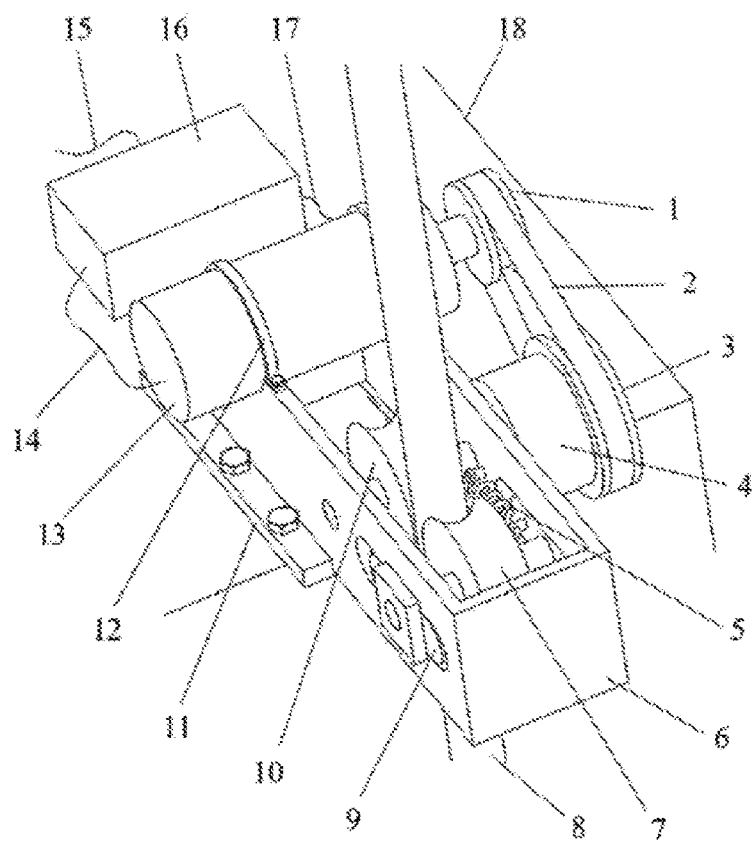
FIG. 1 and FIG. 2 are schematic diagrams of a mechanical structure of the present invention.

In the drawings: 1, power generator pulley; 2, V-belt; 3, electromagnetic clutch pulley; 4, electromagnetic clutch; 5, tension spring; 6, body; 7, sliding roller; 8, guide wire rope; 9, U-shaped slide block; 10, fixed roller; 11, slide recess base; 12, power generator fastening ring; 13, power generator; 14, power generator power line; 15, battery connection line; 16, electrical cabinet; 17, electromagnetic clutch power supply line; 18, flexible lifting container; 19, preloaded spring; and 20, power generating device.

DESCRIPTION OF THE EMBODIMENTS

The present invention is further explained below with reference to the accompanying drawings.

Figure 2:
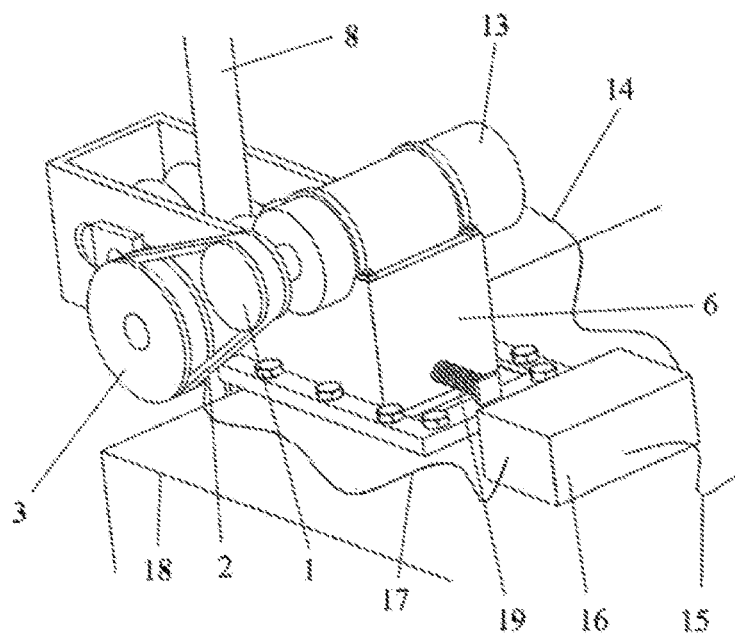
Figure 3:
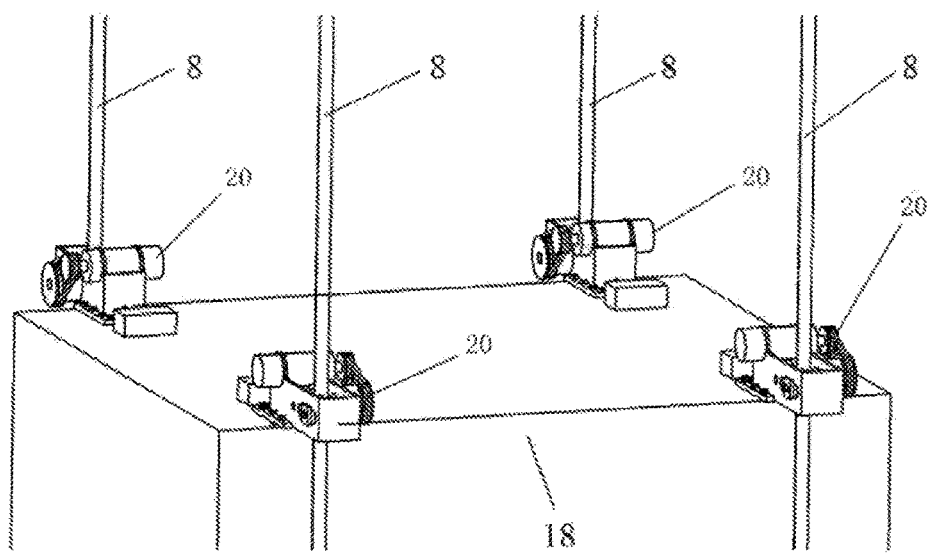
FIG. 3 is a distribution diagram of a plurality of power generating devices on a flexible lifting container according to the present invention.

As shown in FIG. 1 to FIG. 3, the present invention provides a lifting container power generating device using a flexible guidance system, where the power generating device 20 includes a power source section, a power transmission section and an electrical section.

The power source section includes a fixed roller 10, a preloaded spring 19, a body 6, a slide recess base 11, a sliding roller 7, a tension spring 5, and a U-shaped slide block 9. The slide recess base 11 is connected to a top portion of a flexible lifting container 18 with a screw, the body 6 is connected to the slide recess base 11 through a linear bearing, and the body 6 can move in a straight line on the slide recess base 11. The fixed roller 10 and the sliding roller 7 are symmetrically disposed at two sides of a guide wire rope 8, and an axle of the fixed roller 10 is mounted on a fixed roller bearing of the body 6. The preloaded spring 19 is connected to the body 6 at one end, and connected to the slide recess base 11 at the other end. The body 6 tends to slide away from the flexible lifting container 18 under the effect of the preloaded spring 19, and the fixed roller 10 mounted on the body 6 tightly presses against the surface of the guide wire rope 8 to hinder occurrence of this movement. The sliding roller 7 is installed on a sliding roller bearing of the U-shaped slide block 9, and the U-shaped slide block 9 can move in a straight line in a U-shaped slide groove on the body 6. The tension spring 5 is connected to the body 6 at one end, and connected to the U-shaped slide block 9 at the other end. Under the combined action of the preloaded spring 19 and the tension spring 5, the fixed roller 10 and the sliding roller 7 jointly press tightly against the guide wire rope 8.

To reduce abrasion between the two rollers and the guide wire rope 8 and increase friction therebetween, outer rims of the fixed roller 10 and the sliding roller 7 both have internally-curved shapes, so as to increase a contact area. Moreover, a portion of the fixed roller 10 that contacts the guide wire rope 8, and a portion of the sliding roller 7 that contacts the guide wire rope 8 are both provided with a rubber layer, so as to increase the friction therebetween.

The power transmission section includes a power generator 13, an electromagnetic clutch 4, an electromagnetic clutch pulley 3, a V-belt 2, and a power generator pulley 1. An input shaft of the electromagnetic clutch 4 is connected to the axle of the fixed roller 10, an output shaft of the electromagnetic clutch 4 is connected to the electromagnetic clutch pulley 3, the electromagnetic clutch pulley 3 is connected to the power generator pulley 1 via the V-belt 2, and the power generator pulley 1 is mounted on an input shaft of the power generator 13. The power generator 13 is mounted on the slide recess base 11 via a power generator fastening ring 12.

When the flexible lifting container 18 moves up and down, the fixed roller 10 delivers torque to an input end of the electromagnetic clutch 4. When the electromagnetic clutch 4 is powered on to work, the torque is delivered from the input end to an output end, and then is transmitted to the power generator 13 through the electromagnetic clutch pulley 3, the V-belt 2, and the power generator pulley 1. The power generator 13 performs power generation to generate an alternating current. When a working circuit of the electromagnetic clutch 4 is disconnected, the torque cannot be delivered from the input end to the output end. Thus, no torque is transmitted to the power generator 13 through the whole process, and the power generator does not generate power.

The power source section includes an electrical cabinet 16 mounted on the top portion of the flexible lifting container 18, the electrical cabinet 16 being connected to the electromagnetic clutch 4, the power generator 13 and a battery of the lifting container.

Figure 4:
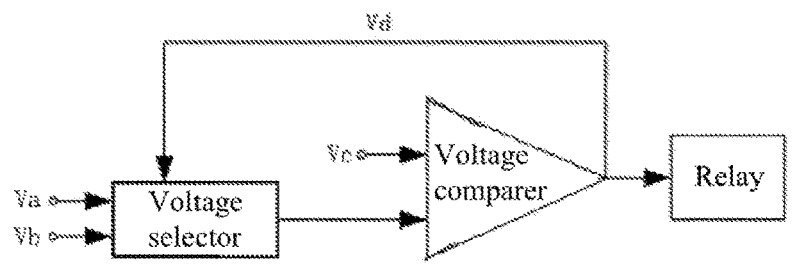
FIG. 4 is a schematic diagram showing a control by an electromagnetic clutch according to the present invention.
Figure 5:
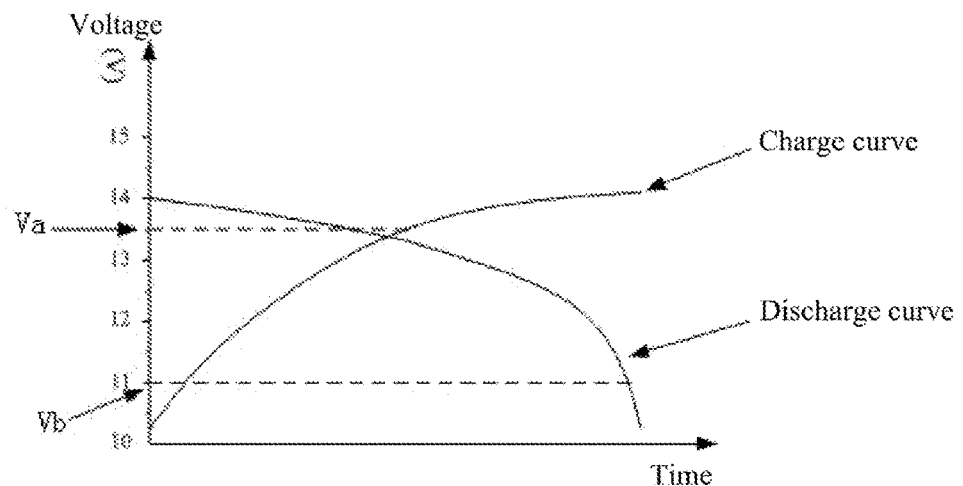
FIG. 5 is a curve diagram showing a change in voltage charging and discharging of a battery of the present invention (a 12V battery is used as an example in the figure).

As shown in FIG. 4 and FIG. 5, the electrical cabinet 16 includes a circuit conditioning module and an electromagnetic clutch control module.

An input end of the circuit conditioning module is connected to an output end of the power generator 13 via a power generator power line 14, and an output end of the circuit conditioning module is connected to a charging interface of the battery of the lifting container via a battery connection line 15.

The electromagnetic clutch control module includes a voltage selector, a voltage comparer, and a relay. A charge cut-off voltage is input through a first input end of the voltage selector, a discharge cut-off voltage is input through a second input end of the voltage selector, an output end of the voltage selector is connected to a first input end of the voltage comparer, and a second input end of the voltage comparer is connected to an output end of the battery of the flexible lifting container via the battery connection line 15. An output end of the voltage comparer is connected to a third input end of the voltage selector and an input end of the relay, and an output end of the relay is connected to a working circuit of the electromagnetic clutch 4 via an electromagnetic clutch power supply line 17.

There are two input voltages for the voltage selector to select from, which are respectively a charge cut-off voltage $V_a$ and a discharge cut-off voltage $V_b$. The output end selects a specific voltage according to a control-end signal, and outputs the selected voltage. The voltage comparer is able to make a comparison between the two voltages at the input end, and output a different level according to a different comparison result. The input two comparison voltages are respectively a battery voltage $V_c$ and a voltage output by the voltage selector. The relay controls on/off of the working circuit of the electromagnetic clutch according to an input level signal.

In an actual operation, a single power generating device 20 may be unable to implement continuous power supply for the battery. Therefore, a manner of connecting a plurality of power generating devices 20 in parallel is used to enhance the gathered energy. FIG. 3 is a schematic diagram showing that a plurality of power generating devices 20 is mounted on a top portion of the flexible lifting container 18.

A self-power generating method of the flexible lifting container of the present invention includes the following specific steps:

a. A plurality of power generating devices 20 is mounted on a top portion of the flexible lifting container 18 according to actual work requirements.

b. Under the effect of the preloaded spring 19 and the tension spring 5, the fixed roller 10 and the sliding roller 7 tightly press against the surface of the guide wire rope 8. When a voltage of the battery is lower than the discharge cut-off voltage Vb, the voltage comparer disposed in the electrical cabinet 16 outputs a high level to have the relay closed, and the working circuit of the electromagnetic relay 4 is turned on. The input end and the output end of the electromagnetic relay 4 are intrinsically connected. In addition, the high level output by the voltage comparer is used as a feedback voltage Vd to control the voltage selector to output the charge cut-off voltage Va as an input voltage of the voltage comparer. During up-and-down movement of the flexible lifting container 18, the fixed roller 10 rotates due to friction with the guide wire rope 8. The torque is delivered to the power generator through the electromagnetic relay 4, the electromagnetic relay pulley 3, the V-belt 2, and the power generator pulley 1. The power generator 13 works to generate an alternating current. The generated alternating current is transmitted to the circuit conditioning module located in the electrical cabinet 16 via the power generator power line 14. The circuit conditioning module performs operations such as rectification and voltage stabilization on the alternating current to convert it into a direct current. Then, the battery is charged via a battery connection line 15.

c. When the voltage of the battery exceeds the charge cut-off voltage Va, the voltage comparer outputs a low level to release the relay, and the working circuit of the electromagnetic relay 4 is disconnected. The torque at the input end of the electromagnetic relay 4 cannot be delivered to the output end, and the power generator 13 stops power generation without power input. Moreover, the low level output by the voltage comparer is used as a feedback voltage Vd to control the voltage selector to output the discharge cut-off voltage Vb as an input voltage of the voltage comparer.

The above merely describes preferred embodiments of the present invention. It should be noted that, several improvements and modifications may be made by those of ordinary skill in the art without departing from the principle of the present invention, and these improvements and modifications should also be considered within the protection scope of the present invention.

What is claimed is:

1. A lifting container power generating device using a flexible guidance system, wherein the power generating device comprises a power source section, a power transmission section and an electrical section;

the power source section comprises a fixed roller, a preloaded spring, a body, a slide recess base, a sliding roller, a tension spring, and a U-shaped slide block; the slide recess base is connected to a top portion of a flexible lifting container, the body is connected to the slide recess base through a linear bearing, and the body is capable of moving in a straight line on the slide recess base; the fixed roller and the sliding roller are symmetrically disposed at two sides of a guide wire rope, and an axle of the fixed roller is mounted on a fixed roller bearing of the body;

one end of the preloaded spring is connected to the body, and the other end of the preloaded spring is connected to the slide recess base; the sliding roller is installed on a sliding roller bearing of the U-shaped slide block, and the U-shaped slide block is capable of moving in a straight line in a U-shaped slide groove on the body; one end of the tension spring is connected to the body, and the other end of the tension spring is connected to the U-shaped slide block; under combined action of the preloaded spring and the tension spring, the fixed roller and the sliding roller jointly press tightly against the guide wire rope;

the power transmission section comprises a power generator, an electromagnetic clutch, an electromagnetic clutch pulley, a V-belt, and a power generator pulley; an input shaft of the electromagnetic clutch is connected to the axle of the fixed roller, an output shaft of the electromagnetic clutch is connected to the electromagnetic clutch pulley, the electromagnetic clutch pulley is connected to the power generator pulley via the V-belt, and the power generator pulley is mounted on an input shaft of the power generator; and the power source section comprises an electrical cabinet (16) mounted on the top portion of the flexible lifting container, and the electrical cabinet is connected to the electromagnetic clutch, the power generator and a battery of the lifting container respectively.

2. The lifting container power generating device using the flexible guidance system according to claim 1, wherein the electrical cabinet comprises a circuit conditioning module and an electromagnetic clutch control module;

an input end of the circuit conditioning module is connected to an output end of the power generator via a power generator power line, and an output end of the circuit conditioning module is connected to a charging interface of the battery of the lifting container via a battery connection line; and the electromagnetic clutch control module comprises a voltage selector, a voltage comparer, and a relay; a charge cut-off voltage is input through a first input end of the voltage selector, a discharge cut-off voltage is input through a second input end of the voltage selector, an output end of the voltage selector is connected to a first input end of the voltage comparer, and a second input end of the voltage comparer is connected to an output end of the battery of the lifting container via the battery connection line; an output end of the voltage comparer is connected to a third input end of the voltage selector and an input end of the relay respectively, and an output end of the relay is connected to a working circuit of the electromagnetic clutch via an electromagnetic clutch power supply line.

3. The lifting container power generating device using the flexible guidance system according to claim 1, wherein outer rims of the fixed roller and the sliding roller both have internally-curved shapes.

4. The lifting container power generating device using the flexible guidance system according to claim 3, wherein a portion of the fixed roller that contacts the guide wire rope, and a portion of the sliding roller that contacts the guide wire rope are both provided with a rubber layer.

5. The lifting container power generating device using the flexible guidance system according to claim 2, wherein outer rims of the fixed roller and the sliding roller both have internally-curved shapes.

6. The lifting container power generating device using the flexible guidance system according to claim 5, wherein a portion of the fixed roller that contacts the guide wire rope, and a portion of the sliding roller that contacts the guide wire rope are both provided with a rubber layer.

* * * * *